Dec. 2, 1952 T. F. VAIDA ET AL 2,619,840

TALKING MACHINE

Filed March 30, 1949 2 SHEETS—SHEET 1

INVENTORS
Theodore F. Vaida
George J. Vaida
BY Kenyon & Kenyon
ATTORNEYS

Dec. 2, 1952 T. F. VAIDA ET AL 2,619,840

TALKING MACHINE

Filed March 30, 1949 2 SHEETS—SHEET 2

INVENTORS
Theodore F. Vaida
George J. Vaida
BY Kenyon & Kenyon
ATTORNEYS

Patented Dec. 2, 1952 2,619,840

UNITED STATES PATENT OFFICE 2,619,840

TALKING MACHINE

Theodore F. Vaida and George J. Vaida, High Bridge, N. J.

Application March 30, 1949, Serial No. 84,418

13 Claims. (Cl. 74—200)

This invention relates to talking machines and more particularly to a device whereby "long playing" talking machine records, which require different turntable rotational speeds than conventional records, as well as conventional records, may be played on the standard type of record player.

Standard types of record players have a turntable which rotates at about 77 to 78 R. P. M. These record players are designed to properly reproduce the recorded sounds on conventional talking machine records. Latterly, new types of records, called "long playing" records have appeared on the market. They have the advantage of reproducing a longer piece of music on a fewer number of record sides so as to reduce the amount of record changing required in order to play an entire piece. These new types of records require different turntable speeds than conventional records, and also require different turntable speeds each from the other. For example, two of the new records require turntable speeds of 45 R. P. M. and 33⅓ R. P. M., respectively.

Thus, in order to be able to play all of these three types of records, one must have a record player adapted to give turntable speeds of 33⅓ R. P. M., 45 R. P. M., and 77 to 78 R. P. M.

It is an object of this invention to provide such a device that will permit different turntable speeds, for example of 33⅓ R. P. M., 45 R. P. M., and 77 to 78 R. P. M., when mounted upon the conventional record player.

It is a further object of this invention to provide such a device that may be easily and permanently affixed by anyone of ordinary skill to the conventional record player.

It is a further object to provide such a device whereby selection of the required turntable speeds may be made by simple, rapid, manual adjustments.

It is a further object to provide such a device that will be sufficiently compact so as not to interfere with the normal operation of most of the standard types of record changers which are supplied with conventional record players.

Other objects and advantages of this invention will be apparent from the following description of the structure and operation thereof, and from the accompanying drawings which illustrate as an example, and not as a limitation, one embodiment of the invention. In the drawings, Fig. 1 is a plan view of the device with parts broken away to show the driving means;

*Structure*

Figure 1:
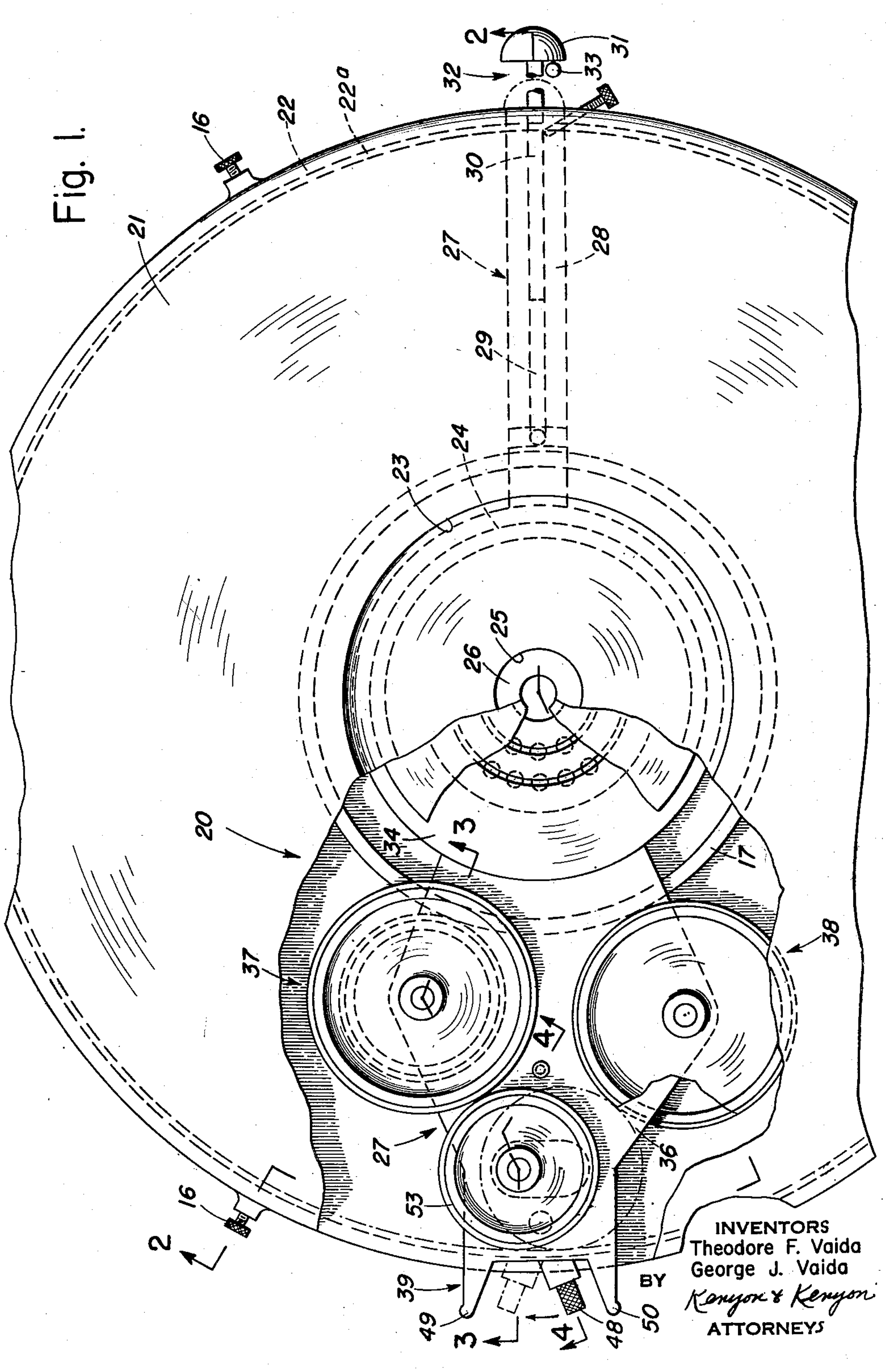
Figure 2:
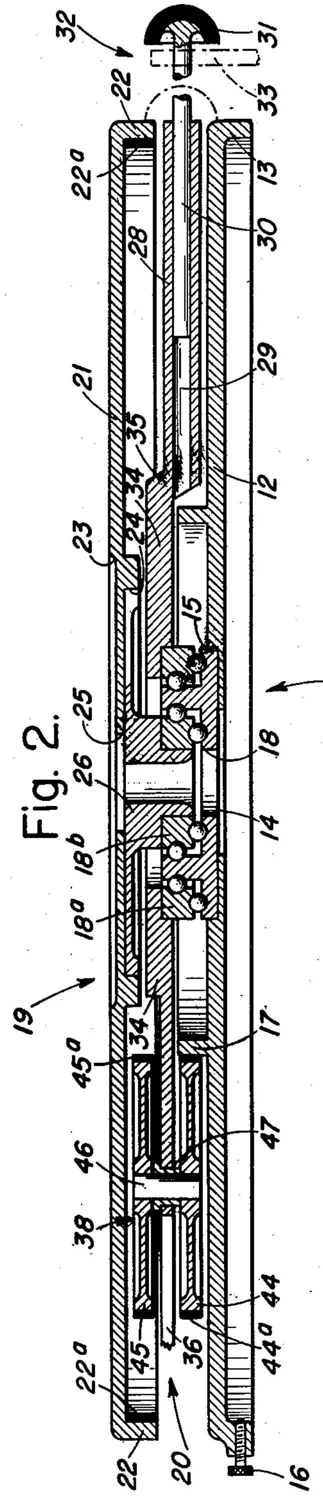
Fig. 2 is a cross sectional view taken along the line 2—2 of Fig. 1.

Referring now to Figs. 1 and 2 of the drawings, the base plate 11, consists of a flat disk 12 having a lower flange 13, around its periphery, and having a circular hole 14 in its center and a circular recess 15 at the center of its upper surface. The base plate 11 is adapted to be secured to a record player turntable for rotation therewith, as by a plurality of thumb screws 16 threaded, at appropriate intervals, through the lower flange 13, so as to frictionally engage the edge of said turntable, when properly adjusted.

On the upper face of base plate 11, and integral therewith, is an annular driving ring 17, the function of which will be later explained. Centrally mounted on base plate 11 and pressed into the recess 15 is a hollow center, double bearing 18 which rotatably supports the record supporting assembly 19 and the driving assembly 20, on its inner and outer races, respectively. The driving assembly 20 is positioned between the base plate 11 and the record supporting assembly 19.

As shown in Figs. 1 and 2, the record supporting assembly 19 consists of a flat disk 21 having a lower flange 22, the inside rim of which may be provided with a rim 22a of rubber or other like material around its periphery. Said record supporting assembly is provided with a circular recess 23 at the center of its upper surface, and a second circular recess 24 at the center of its lower surface and a bore hole 25 through the center of said assembly. The upper surface of the record supporting assembly 19 may be covered with felt (not shown), or a like material, so that a record may be placed thereon and retained in position when the assembly is rotated. A bushing 26 is pressed in the circular recess 24 and rides upon the inner race of bearing 18, which thereby rotatably supports record supporting assembly 19.

As can best be seen in Figs. 1 and 2 the driving assembly 20 consists of certain elements, which will be later described, in combination with an irregular shaped support 27, which for convenience of description will be considered as being composed of three parts, it being understood that all three are integral with each other.

At the right hand portion of Figs. 1 and 2 is a flat part 28 of support 27. Said part 28 has a cylindrical opening 29 through its length, slidable longitudinally in opening 29 is rod 30, with a knob 31 at its right extremity covered with rubber or other friction material. Said rod and knob comprise a movable extension 32 of support 27. Movable extension 32 may be pushed into opening 29, until the edge of knob 31 engages the edges of flanges 13 and 22, as shown by the dotted line position in Figs. 1 and 2, or it may be pulled out until it engages stop 33, as shown in the solid line position in Figs. 1 and 2. Stop 33 may be affixed to the base of the record player, or to the tone arm, or to any other non-rotating part of the record player.

Shown at the center of Figs. 1 and 2 is a circular part 34 of support 27. As can best be seen at 35 in Fig. 2 the flat part 28 is at a lower elevation than the circular part 34. The flat underside of circular part 34 is secured to the outer race 18a of bearing 18.

The center portion of circular part 34 is provided with an opening so as to permit bushing 26 to project downward therethrough, and thus to be secured to the inner race 18b of bearing 18, and also to permit the turntable pin (not shown) to project upward through the device.

Shown at the left portion of Figs. 1 and 2, is a lozenge shaped part 36 of support 27 integrally joined with circular piece 34. As shown in Fig. 1, rotatably mounted on the upper portion of part 36 as that part is positioned in Fig. 1, is a set of wheels 37. Rotatably mounted on the lower portion of part 36 is a second set of wheels 38, and mounted at the left extremity of part 36 is toggle assembly 39.

Figure 3:
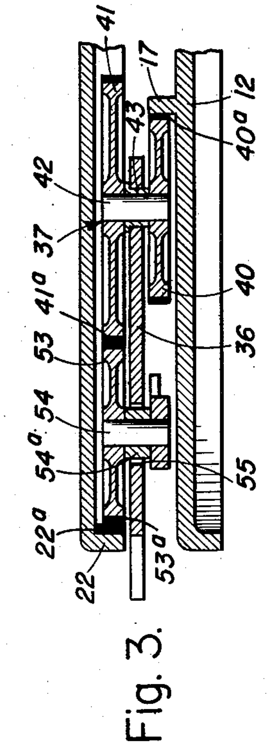
Fig. 3 is a cross sectional view taken along the line 3—3 of Fig. 1.

As can best be seen in Fig. 3, set of wheels 37 comprises a lower wheel 40, which may be provided with a rim 40a of rubber or other like material, all of which types of rim material are hereinafter referred to as "rubber rims," and an upper wheel 41 having a rubber rim 41a, and affixed to a common shaft 42 which passes through part 36 of support 27. Shaft 42 is rotatably mounted on said support by bushing 43. Lower wheel 40 is in contact with annular driving ring 17.

As can best be seen in Fig. 2, set of wheels 38 comprises a lower wheel 44 having a rubber rim 44a and an upper wheel 45 having a rubber rim 45a, and affixed to a common shaft 46 which passes through part 36 of support 27. Shaft 46 is rotatably mounted on said support by bushing 47, which is affixed to part 36. Lower wheel 44 is in contact with annular driving ring 17.

Figure 5:
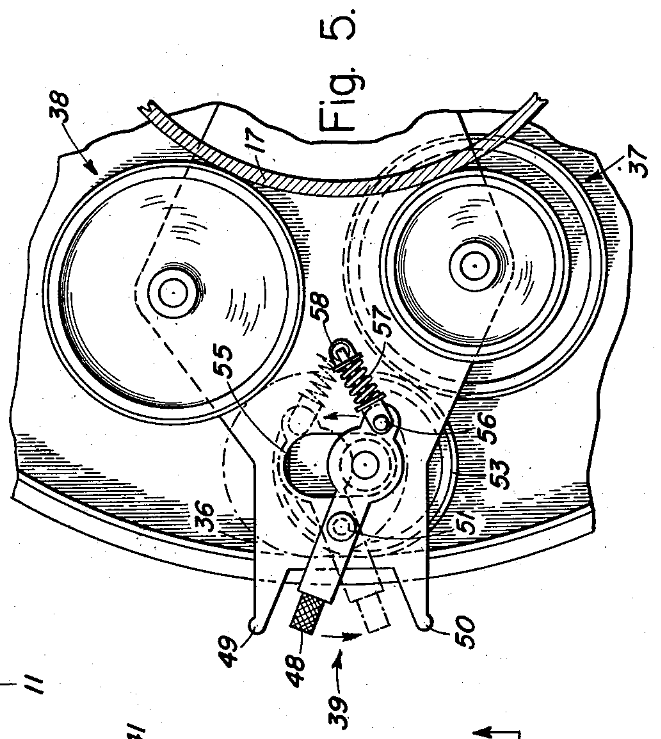
Fig. 5 is a reverse plan section taken along the line 5—5 of Fig. 4.
Figure 4:
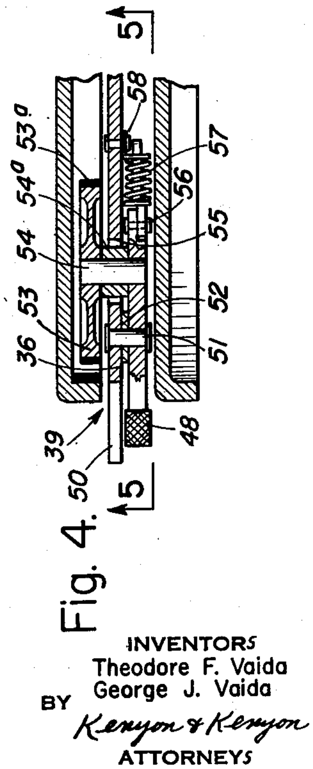
Fig. 4 is a cross sectional view taken along the line 4—4 of Fig. 1.

As can best be seen in Figs. 4 and 5, toggle assembly 39 consists of a manually controllable lever 48 movable between extending ears 49 and 50 of part 36 of support 27, to either of the two positions shown in Figs. 1 and 5, and pivotally mounted on part 36 by pin 51 and washer 52. Positioned above part 36, as seen in Fig. 4, is driven wheel 53 having a rubber rim 53a which is rotatably mounted on shaft 54 and bushing 54a. As seen in Fig. 4, shaft 54 extends downward through aperture 55 in part 36, and is rigidly affixed to lever 48 to the right of pin 51. Rotatably affixed to the right extremity of lever 48 by pin 56 is a spring-loaded, snap-over switch 57, the spring thereof being compressed. The right end of switch 57 is rotatably affixed to part 36 by pin 58. Wheel 53 is in driving relation to flange 22 of the record supporting assembly 19 in either position of lever 48. It is positioned to be driven by wheel 41 in one position of the lever and by wheel 45 in the other position of the lever.

*Operation*

The assembled device may be installed on a conventional record player by placing it on top of the turntable, with the base plate 11 of the device resting on the turntable. The turntable centering pin will project through the center of the device, and above the upper surface of the record supporting assembly 19, and so be in position to perform its usual function of centering the records.

The device is affixed to the turntable and centered thereon by adjusting the thumb screws 16, which are mounted in lower flange 13, against the edge of the turntable.

In order to play a conventional 77–78 R. P. M. record, the device is left in its attached position on the turntable, the movable extension 32 is pushed in until the rubber covered knob 31 thereof frictionally engages the flanges 13 and 22 of the record supporting assembly and the base plate respectively, and thereby effectively locks these last two together. Thus when the turntable rotates at 77–78 R. P. M., as it is set to do, the entire device, including the record supporting assembly will be rotated at the same speed, and a conventional record may be played thereon.

In order to play one of the two types of long playing records, the movable extension 32 is pulled out until it engages the fixed stop 33, lever 48 is then manually operated to select either one of the two required speeds. When the turntable rotates at its normal speed, in the present embodiment of this invention, the record supporting assembly 19 will rotate at a speed of either 33⅓ R. P. M. or 45 R. P. M. depending on the position of lever 48, and the proper rotational speeds for long playing records are thus available. In order to play a long playing record it is also necessary that the tone arm weight, transmitted to the record surface through the needle, be less than when the tone arm is used with conventional records. To achieve this the tone arm is provided with a shiftable counterweight affixed thereto (not shown) whereby the effective pressure of said tone arm may be varied.

When movable extension 32 is pulled out until it engages fixed stop 33 as above described, driving assembly 20, of which extension 32 is a part, is held in a fixed position, while the remainder of the device is free to be rotated by the operation of the turntable.

As the turntable rotates it rotates the base plate 11 in the same direction, for example clockwise. As can best be seen in Figs. 1 and 5, and annular driving ring 17 thus rotates at the same angular velocity as the turntable, but at a different peripheral velocity. The lower wheels 40 and 44 of sets of wheels 37 and 38, respectively, which are a part of driving assembly 20, frictionally engage the annular driving ring 17 and are rotated by it in the opposite direction from the base plate 11 and the turntable. As lower wheels 40 and 44 are of different dimensions, upper wheels 41 and 45 of the two sets of wheels are thereby driven at different peripheral speeds.

Lever 48 of toggle assembly 39 must be manually moved to one of the two possible positions, indicated in Figs. 1 and 5. The spring-loaded snap-over switch 57 of lever 48 assures that the lever is in either one of the two possible positions. As the lever is manually moved, driven wheel 53 is moved either to the solid line position or to the dotted line position shown in Fig. 5. At either of these positions the driven wheel is pressed, by the action of the spring-loaded snap-over switch, against either upper wheel 41 or 45 and also against the inside of flange 22 of record supporting assembly 19.

Thus, as the annular driving ring 17 rotates, it drives lower wheels 40 and 44, and thus drives upper wheels 41 and 45. Driven wheel 53 which is in contact with one or the other of upper wheels 41 and 45, and is also in contact with flange 22 of record supporting assembly 19, thus drives record supporting assembly 19 in the opposite direction from the sets of wheels 37 and 38 and in the same direction as the base plate 11 and the turntable.

In the present embodiment of the invention, when the record player turntable is rotating at 78 R. P. M., the proportions of the parts are such that the combination of the peripheral speeds of annular driving ring 17, lower wheel 44, upper wheel 45, and driven wheel 53 drives the record supporting assembly 19 at a speed of 33⅓ R. P. M. when lever 48 is in the dotted line position as shown in Figs. 1 and 5, and the proportions of the parts are such that the combination of the peripheral speeds of annular driving ring 17, lower wheel 40, upper wheel 41, and driven wheel 53 drives the record supporting assembly 19 at a speed of 45 R. P. M. when lever 48 is in the solid line position as shown in Figs. 1 and 5.

Thus by simple manual adjustment of either lever 48 and/or movable extension 32 any one of the three required rotational speeds may be obtained.

We have thus described one embodiment of our invention and illustrated its use and it will be apparent therefrom that the device hereinbefore described may be modified and the dimensions of its parts altered or parts added thereto so as to provide a choice of two or more different speeds of rotation in addition to that which is presently required for the records now commercially available. Therefore, this invention is not to be limited to the particular speeds of rotation or to three speeds of rotation as described above, or to the particular construction shown. What we claim as new and desire to secure by Letters Patent, is:

1. The combination of a first member adapted to be mounted on a record player turnable for rotation therewith, a record supporting member rotatably mounted on said first member, driving means for rotating said record supporting member in the same direction but at a plurality of predetermined speeds with respect to said first member, and means whereby said record supporting member may be rotated at the same speed as said first member.

2. The combination of a first member adapted to be mounted on a record player turntable for rotation therewith, a record supporting member rotatably mounted on said first member, said first member having an annular driving ring, and a plurality of wheels selectively engaging said driving ring, and adapted to rotate said record supporting member at different predetermined speeds with respect to said first member.

3. The combination of claim 2, including means whereby said first member and said record supporting member may be clutched together to rotate at the same speed.

4. The combination of a first member having an annular driving ring, and adapted to be mounted on a record player turntable for rotation therewith, a record supporting member having an annular ring and rotatably mounted on said first member, a third member rotatably mounted between said first member and said record supporting member, and provided with an extension adapted to engage a stop mounted on said record player whereby said third member may be held in a fixed position during rotation of said first named member and said record supporting member, said third member having two sets of wheels rotatably mounted thereon, each set consisting of two wheels mounted on a common shaft and rotating therewith, one wheel of each set of wheels frictionally engaging said annular driving ring and being driven by it, the other wheel of each set of wheels rotating at different predetermined peripheral speeds, said other wheels being adapted to be frictionally engaged by a driven wheel, a toggle switch connected to said driven wheel, said toggle switch being manually adjustable to one of two possible positions, said driven wheel also engaging the annular ring of said record supporting member when said toggle switch is at one of its two possible positions, whereby said driven wheel is also in contact with either of said other wheels, and thereby rotating said record supporting member at one of two different rotational speeds with respect to said first member.

5. The combination of claim 4, wherein said third member is provided with a movable extension adapted to be manually moved into or out of engagement with said stop, said extension being provided with a clutch operable when said extension is out of engagement with said stop to frictionally engage with said first member and said record supporting member and cause them to be rotated at the same speed.

6. The combination of a first member adapted to be secured to a record player turntable for rotation therewith, a flat record supporting member rotatably mounted on said first member, and a driving mechanism operatively connected between said first member and said supporting member for rotating said record supporting member at different speeds with respect to said first-named member and including means for manually setting said driving mechanism to rotate said record supporting member at either of two different speeds with respect to said first named member, said driving mechanism including a plurality of wheels driven by said first named member and a third wheel for selectively driving the turntable from one of said first named wheels.

7. The combination of claim 6 in which the setting mechanism includes a manually operable toggle switch.

8. The combination of a first member adapted to be mounted on a record player turntable for rotation therewith, a record supporting member rotatably supported on said first member, said first member having an annular driving ring, a wheel engaging said ring and driven thereby, a second wheel coaxially connected to said first-named wheel, a third wheel engaging and driven by said second-named wheel, a support for said wheels, and means for holding said support in fixed position, said third wheel engaging said record supporting member to rotate the same in the same direction as the first named member.

9. The combination of a first member adapted to be mounted on a record player turntable for rotation therewith, a record supporting member rotatably supported on said first member, said first member having an annular driving ring, a wheel engaging said ring and driven thereby, a second wheel coaxially connected to said first-named wheel, a third wheel engaging and driven by said second-named wheel, a support for said wheels, means for holding said support in fixed position, said third wheel engaging said record supporting member to rotate the same in the same direction as the first member, and means for releasing said holding means and clutching said first member and said record supporting member together for rotation at the same speed.

10. The combination of a first member adapted to be mounted on a record player turntable for rotation therewith, a record supporting member rotatably mounted on said first member, said first member having an annular driving ring, and two sets of wheels frictionally engaging said driving ring and having upper and lower wheels, the upper wheels of the sets of wheels rotating at different predetermined peripheral speeds, a driven wheel, a movable mounting for said driven wheel whereby said upper wheels are adapted to be selectively engaged by said driven wheel to drive the latter, said driven wheel also engaging said record supporting member to rotate the same when said wheel is in contact with either of said upper wheels, and thereby rotating said record supporting member at one of two different speeds with respect to said first member.

11. The combination of claim 10, including a clutch whereby said first member and said record supporting member may be secured together to rotate at the same speed.

12. The combination of a first member having an annular driving ring and adapted to be mounted on a record player turntable for rotation therewith, a record supporting member having an annular ring and rotatably mounted on said first member, a third member rotatably mounted between said first member and said record supporting member, and provided with an extension adapted to engage a stop mounted on said record player whereby said third member may be held in a fixed position during rotation of said first member and said record supporting member, said third member having two sets of wheels, each set consisting of two wheels mounted on a rotatable common shaft, one wheel of each set of wheels frictionally engaging said annular driving ring and being driven by it, the other wheel of the sets of wheels rotating at different predetermined peripheral speeds, a driven wheel, a movable mounting for said driven wheel whereby said other wheels are adapted to be selectively frictionally engaged by said driven wheel, said driven wheel also engaging the annular ring of said record supporting member when said driven wheel is in contact with either of said other wheels, and thereby rotating said record supporting member at one of two different speeds with respect to said first member.

13. The combination of claim 12, wherein said third member is provided with a movable extension adapted to be positioned in or out of engagement with said stop said extension being provided with a clutch operable when said extension is out of engagement with said stop to frictionally engage said first member and said record supporting member and cause them to be rotated at the same speed.

THEODORE F. VAIDA.
GEORGE J. VAIDA.

REFERENCES CITED

The following references are of record in the file of this patent:

UNITED STATES PATENTS

| Number | Name | Date |
|---|---|---|
| 1,035,155 | Clark | Aug. 13, 1912 |
| 1,852,456 | Fritz | Apr. 5, 1932 |
| 2,163,066 | Searcy | June 20, 1939 |
| 2,353,370 | Sears | July 11, 1944 |
| 2,469,653 | Kopp | May 10, 1949 |